(12) United States Patent
Huang et al.

(10) Patent No.: US 9,343,730 B2
(45) Date of Patent: May 17, 2016

(54) LITHIUM-ION BATTERY AND DEFORMABLE SAFETY VALVE AS OVERCHARGE PROTECTION DEVICE THEREOF

(71) Applicant: Ningde Contemporary Amperex Technology Limited, NingDe (CN)

(72) Inventors: Shilin Huang, NingDe (CN); Junzhong Hu, NingDe (CN); Pinghua Deng, NingDe (CN)

(73) Assignee: Contemporary Amperex Technology Co., Limited, Ningde, Fujian Province (CN)

( * ) Notice: Subject to any disclaimer, the term of this patent is extended or adjusted under 35 U.S.C. 154(b) by 106 days.

(21) Appl. No.: 14/243,730

(22) Filed: Apr. 2, 2014

(65) Prior Publication Data

US 2014/0302359 A1    Oct. 9, 2014

(30) Foreign Application Priority Data

Apr. 9, 2013    (CN) .................... 2013 2 0173580 U

(51) Int. Cl.
*H01M 2/34*    (2006.01)
*H01M 10/0525*    (2010.01)

(52) U.S. Cl.
CPC .......... *H01M 2/345* (2013.01); *H01M 10/0525* (2013.01); *H01M 2200/20* (2013.01)

(58) Field of Classification Search
CPC ............ H01M 2200/20; H01M 2/345; H01M 2/0473; H01M 10/4257
See application file for complete search history.

(56) References Cited

U.S. PATENT DOCUMENTS

| | | | | |
|---|---|---|---|---|
| 2011/0052949 A1* | 3/2011 | Byun | ................... | H01M 2/043 429/61 |
| 2011/0305929 A1* | 12/2011 | Byun | ................... | H01M 2/345 429/61 |
| 2012/0237802 A1* | 9/2012 | Byun | ................... | H01M 2/043 429/53 |
| 2012/0258340 A1* | 10/2012 | Park | ................... | H01M 10/44 429/61 |
| 2014/0205863 A1* | 7/2014 | Byun | ............... | H01M 10/4257 429/7 |

* cited by examiner

*Primary Examiner* — Carlos Barcena
(74) *Attorney, Agent, or Firm* — Morgan, Lewis & Bockius LLP

(57) ABSTRACT

The present disclosure provides a lithium-ion battery and a deformable safety valve as an overcharge protection device thereof. The deformable safety valve as the overcharge protection device of the lithium-ion battery comprises a short-circuit conductive plate and a deformable plate made from aluminum, a facing surface of the deformable plate being coated with a metal layer to reduce contact resistance between the deformable plate and the short-circuit conductive plate. The lithium-ion battery comprises a first electrode post; a cap plate electrically connected to the first electrode post; an electrolyte-injection hole provided in the cap plate; a vent provided in the cap plate; a deformable safety valve provided to the cap plate; and a second electrode post assembled to the cap plate in an insulating manner; wherein the deformable safety valve is the above deformable safety valve as the overcharge protection device of the lithium-ion battery.

12 Claims, 2 Drawing Sheets

LITHIUM-ION BATTERY AND DEFORMABLE SAFETY VALVE AS OVERCHARGE PROTECTION DEVICE THEREOF

REFERENCE TO RELATED APPLICATIONS

The present application claims priority to Chinese Patent Application No. CN 201320173580.5 filed on Apr. 9, 2013, the content of which is fully incorporated in its entirety herein.

FIELD OF THE PRESENT DISCLOSURE

The present disclosure relates to lithium-ion battery field, particularly relates to a lithium-ion battery and a deformable safety valve as an overcharge protection device thereof.

BACKGROUND OF THE PRESENT DISCLOSURE

With development of modern society and people's awareness of environmental protection, more and more equipment use a rechargeable secondary battery as a power source, such as mobile phones, laptops, electric tools, electrical automobiles and energy storage power stations, which provides a broad space for application and development of the rechargeable secondary battery. Such electrical automobiles and energy storage power stations generally require power batteries with high capacity as the power source. These power batteries should also have good safety and a long cycle life in addition to high capacity, so as to meet an operation standard and meet people's requirements.

An overcharge protection device of a lithium-ion battery mainly adopts a deformable safety valve, the deformable safety valve comprises a short-circuit conductive plate and a deformable plate, when the battery is overcharged, the overcharge protection device realizes short-circuit between a positive electrode and a negative electrode to release battery cell energy through external short-circuit, so as to avoid safety accidents, but aluminum is mainly adopted as materials of the short-circuit conductive plate and the deformable plate in the prior art, as aluminum is easily oxidized into aluminum oxide in air, contact resistance is very large, the aluminum plate of the deformable safety valve is easily molten through at the moment of short-circuit, and simultaneously sparks possibly to set fire to electrolyte in the battery cell, which is very dangerous, and makes the deformable safety valve fail to work.

SUMMARY OF THE PRESENT DISCLOSURE

In view of the problem in the background, an object of the present disclosure is to provide a lithium-ion battery and a deformable safety valve as an overcharge protection device thereof, which can reduce contact resistance, so as to avoid melt-through of the deformable plate made from aluminum, and ensure safe contact therebetween, at the same time produce low heat in a short-circuit process without influencing a battery cell.

In order to achieve the above object, in a first aspect, the present disclosure provides a deformable safety valve as an overcharge protection device of a lithium-ion battery, which comprises a short-circuit conductive plate and a deformable plate made from aluminum, a facing surface of the deformable plate is coated with a metal layer to reduce contact resistance between the deformable plate and the short-circuit conductive plate.

In order to achieve the above object, in a second aspect, the present disclosure provides a lithium-ion battery, which comprises: a first electrode post; a cap plate electrically connected to the first electrode post; an electrolyte-injection hole provided in the cap plate; a vent provided in the cap plate; a deformable safety valve provided to the cap plate; and a second electrode post assembled to the cap plate in an insulating manner; wherein the deformable safety valve is the deformable safety valve as the overcharge protection device of the lithium-ion battery according to the first aspect of the present disclosure.

The present disclosure has the following beneficial effects:

The metal layer provided in the deformable safety valve as the overcharge protection device of lithium-ion battery can reduce contact resistance, so as to avoid melt-through of the deformable plate made from aluminum, and ensure safe contact therebetween, at the same time produce low heat in a short-circuit process without influencing a battery cell.

Figure 1:
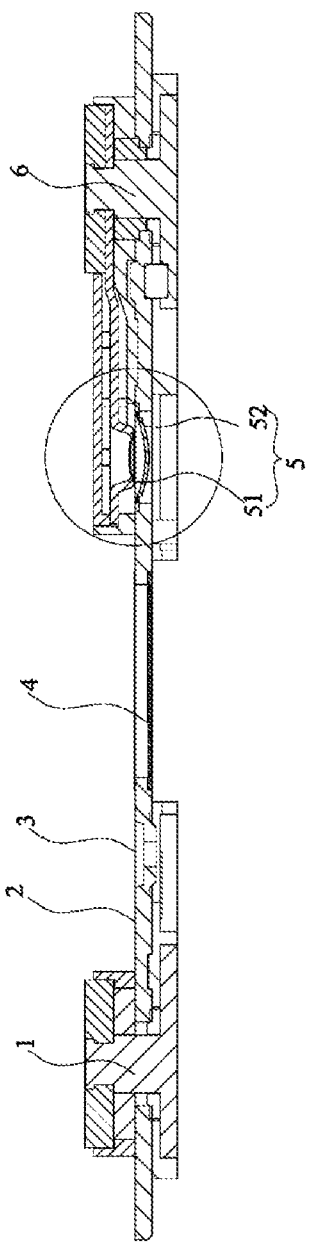
FIG. 1 is a partial structural view of a lithium-ion battery adopting a deformable safety valve as an overcharge protection device of lithium-ion battery according to the present disclosure.

Reference numerals of the embodiments are represented as follows:
1 first electrode post
2 cap plate
3 electrolyte-injection hole
4 vent
5 deformable safety valve
51 short-circuit conductive plate
52 deformable plate
521 facing surface
522 back surface
5221 notch
53 metal layer
6 second electrode post

DETAILED DESCRIPTION

Hereinafter a deformable safety valve as an overcharge protection device of a lithium-ion battery according to a first aspect of the present disclosure will be described in combination with the drawings.

Figure 2:
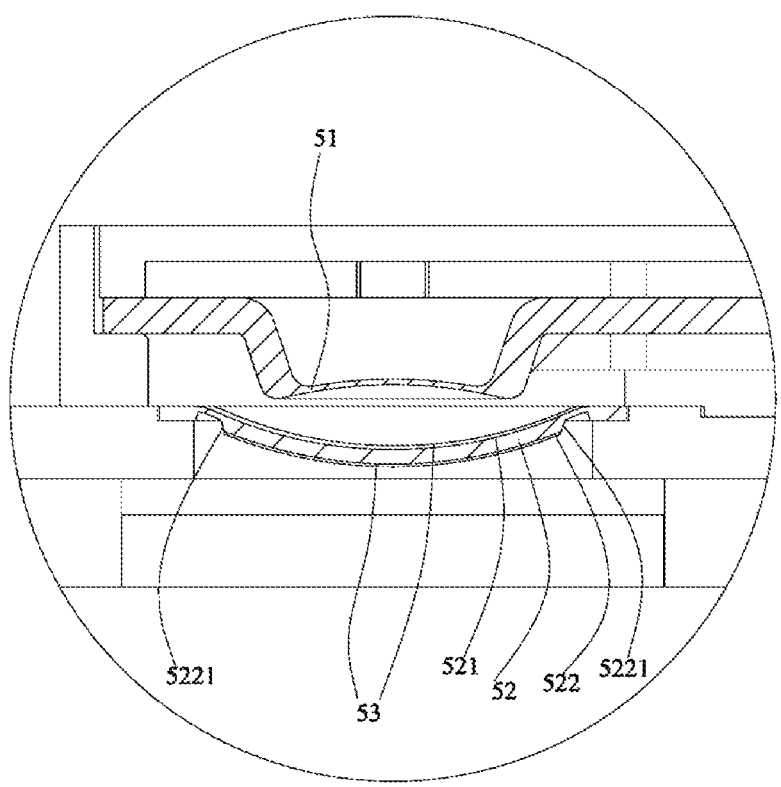
FIG. 2 is an enlarged partial view indicated as a circle of FIG. 1.

As shown in FIG. 1 and FIG. 2, a deformable safety valve 5 as an overcharge protection device of a lithium-ion battery according to a first aspect of the present disclosure comprises a short-circuit conductive plate 51 and a deformable plate 52 made from aluminum, a facing surface 521 of the deformable plate 52 is coated with a metal layer 53 to reduce contact resistance between the deformable plate 52 and the short-circuit conductive plate 51.

In an embodiment of practical application, as shown in FIG. 1 and FIG. 2, edges of a back surface 522 of the deformable plate 52 are provided with a notch 5221, the back surface 522 of the deformable plate 52 is coated with the metal layer 53, a coating range of the metal layer 53 is within the notch 5221.

In the deformable safety valve 5 as the overcharge protection device of the lithium-ion battery according to the first aspect of the present disclosure, the metal layer 53 may be at least one of tin layer, copper layer, nickel layer and gold layer. Preferably, the metal layer 53 is a tin layer. As the tin layer is oxidation resistant, and has low contact resistance, in addition, the tin layer melts when short-circuit to allow the short-circuit conductive plate 51 to be connected to the deformable plate 52 via the molten tin, which further reduces the contact resistance without causing melt-through of the deformable plate 52, and prevents the deformable safety valve 5 from failing to work and the electrolyte in the battery cell from being fired, so as to ensure safe contact between the short-circuit conductive plate 51 and the deformable plate 52, and produce low heat in all the short-circuit process without influencing the battery cell.

In the deformable safety valve 5 as the overcharge protection device of the lithium-ion battery according to the first aspect of the present disclosure, a thickness of the metal layer 53 may be 10~50 μm, preferably 20~40 μm.

In the deformable safety valve 5 as the overcharge protection device of the lithium-ion battery according to the first aspect of the present disclosure, the coating of the metal layer 53 may adopt such as electroplating, brush plating, spraying or sputtering.

In the deformable safety valve 5 as the overcharge protection device of the lithium-ion battery according to the first aspect of the present disclosure, preferably, a shape of the short-circuit conductive plate 51 is flat plate, flat plate with stretched pits, perforated plate, plate with pits, or arc-shaped plate (as shown in FIG. 1 and FIG. 2), or arc-shaped plate.

In the deformable safety valve 5 as the overcharge protection device of the lithium-ion battery according to the first aspect of the present disclosure, as shown in FIG. 1 and FIG. 2, preferably, the deformable plate 52 is arc-shaped, more preferably is circular arc-shaped.

Hereinafter a lithium-ion battery according to a second aspect of the present disclosure will be described.

As shown in FIG. 1, a lithium-ion battery according to the second aspect of the present disclosure comprises: a first electrode post 1; a cap plate 2 electrically connected to the first electrode post 1; an electrolyte injection hole 3 provided in the cap plate 2; a vent 4 provided in the cap plate 2; a deformable safety valve 5 provided to the cap plate 2; a second electrode post 6 assembled to the cap plate 2 in an insulating manner; wherein the deformable safety valve 5 is the deformable safety valve 5 as the overcharge protection device of the lithium-ion battery according to the first aspect of the present disclosure.

In the lithium-ion battery according to the second aspect of the present disclosure, the first electrode post 1 is electrically connected to the cap plate 2, which may be realized by welding or riveting.

In the lithium-ion battery according to the second aspect of the present disclosure, the second electrode post 6 is assembled to the cap plate 2 in an insulating manner, which may be realized by injection molding.

In the lithium-ion battery according to the second aspect of the present disclosure, a shape of the cap plate 2 may be a rectangle, a circle or an ellipse.

What is claimed is:

1. A deformable safety valve as an overcharge protection device of a lithium-ion battery, comprising:
a short-circuit conductive plate and a deformable plate made from aluminum, a facing surface of the deformable plate being coated with a metal layer to reduce contact resistance between the deformable plate and the short-circuit conductive plate,
wherein edges of a back surface of the deformable plate are provided with a notch, the back surface of the deformable plate is coated with the metal layer, and a coating range of the metal layer on the back surface is within the notch.

2. The deformable safety valve as the overcharge protection device of the lithium-ion battery according to claim 1, wherein the metal layer is at least one of tin layer, copper layer, nickel layer and gold layer.

3. The deformable safety valve as the overcharge protection device of the lithium-ion battery according to claim 2, wherein the metal layer is tin layer.

4. The deformable safety valve as the overcharge protection device of the lithium-ion battery according to claim 1, wherein a thickness of the metal layer is 10~50 μm.

5. The deformable safety valve as the overcharge protection device of the lithium-ion battery according to claim 4, wherein the thickness of the metal layer is 20~40 μm.

6. The deformable safety valve as the overcharge protection device of the lithium-ion battery according to claim 1, wherein a shape of the short-circuit conductive plate is flat plate, flat plate with stretched pits, perforated plate, plate with pits, or arc-shaped plate; and the deformable plate is arc-shaped.

7. A lithium-ion battery, comprising:
a first electrode post;
a cap plate electrically connected to the first electrode post;
an electrolyte-injection hole provided in the cap plate;
a vent provided in the cap plate;
a deformable safety valve provided to the cap plate; and
a second electrode post assembled to the cap plate in an insulating manner;
the deformable safety valve comprising a short-circuit conductive plate and a deformable plate made from aluminum, a facing surface of the deformable plate being coated with a metal layer to reduce contact resistance between the deformable plate and the short-circuit conductive plate,
wherein edges of a back surface of the deformable plate are provided with a notch, the back surface of the deformable plate is coated with the metal layer, a coating range of the metal layer on the back surface is within the notch.

8. The lithium-ion battery according to claim 7, wherein the metal layer is at least one of tin layer, copper layer, nickel layer and gold layer.

9. The lithium-ion battery according to claim 8, wherein the metal layer is tin layer.

10. The lithium-ion battery according to claim 7, wherein a thickness of the metal layer is 10~50 μm.

11. The battery according to claim 10, wherein the thickness of the metal layer is 20~40 μm.

12. The lithium-ion battery according to claim 7, wherein a shape of the short-circuit conductive plate is flat plate, flat plate with stretched pits, perforated plate, plate with pits, or arc-shaped plate; and the deformable plate is arc-shaped.

* * * * *